United States Patent Office 3,228,954
Patented Jan. 11, 1966

---

3,228,954
CERTAIN 3-(SUBSTITUTED ALLYL)-RHODANINES
Harry G. Durham and Hsing Yun Fan, Modesto, Calif., assignors to Shell Oil Company, New York, N.Y., a corporation of Delaware
No Drawing. Filed Aug. 19, 1964, Ser. No. 390,744
3 Claims. (Cl. 260—306.7)

The present invention relates to a novel class of rhodanine compounds, characterized by a 2-substituted allyl moiety bonded by the nitrogen atom. These novel compounds have been found useful in the prevention and control of diseases caused by microorganisms. These compounds are of special interest as fungistats, bacteriostats and as soil fungicides to control soli-borne diseases of plants.

Many of the organisms which form part of the disease complex that inhabit the soil subsist on living plants. Many injure the roots and other underground portions, others attack the crown of the plant, while still others are capable of damaging the stem and other aboveground portions of the plant. When plants are grown year after year in the same soil, the injury by soil pathogens is most likely to become more serious the longer the land is in cultivation, because the ready food supply leads to building of the pathogen population.

Attempts have been made to control soil fungi by suitable crop rotation, by the elimination of weeds which serve as hosts for the disease organisms, and by the propagation of resistant varieties of crops. These, and other cultural practices, have tended to reduce the damage of soil pathogens but have not fully met the present needs of intensive agriculture. The use of chemicals has met with considerable measure of success and has been confined to high value crops. The major chemicals of importance for field application to soil have been the more volatile substances which penetrate well into the soil spaces, exert their toxic action as a vapor, then volatilize from the soil prior to planting of the crop. These compounds are generally applied to the soil in high gallonage and are relatively expensive. Furthermore, there is the danger that if the chemical has not left the soil, it may be phytotoxic to the crop.

There now has been discovered a new class of chemicals which are remarkably effective as soil fungicides but are not phytotoxic at the fungicidally effective dosages. These are fungitoxic to a broad spectrum of noxious soil fungi and can be used with safety with respect to injury of the crop to be protected. These chemicals because of their low effective concentrations will provide fungus control at much lower dosage levels than the conventional volatile materials. This should permit chemical control of soil fungi for crops for which heretofore no effectively economic control has been possible.

The compounds of this invention have been found effective on many of the more important genera of fungi which cause rot and damping-off of plants. These include species of Pythium, Verticillium, Phytophthora, Rhizotonia, Fusarium, and Thielaviopsis.

In addition the compounds of this invention have been found to be very effective in controlling the growth of a number of pathogenic organisms of importance to man and domestic animals such as certain gram negative and acid-fast bacteria.

British Patent 745,168 teaches that N-aliphatic rhodanines show poor activity against mircroorganisms. It was therefore surprising to discover that the N-(2-substituted)allyl rhodanine derivatives of this invention are highly active against a number of important microorganisms.

These novel biocides are generally characterized as rhodanines having a 2-substituted allyl group bonded to the nitrogen atom of the rhodanine nucleus. They may be represented by the formula:

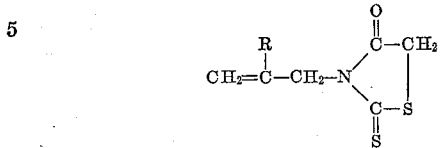

wherein R represents cyano, halogen, halogen-susbstituted alkyl of 1 to 4 carbon atoms, nitro, and dialkylamino of 2 to 8 carbon atoms.

Representative N-(2 - substituted)rhodanines active against microorganisms according to this invention include, for example 3-(2-chloroallyl)rhodanine;
3-(2-bromoallyl)rhodanine;
3-(2-iodoallyl)rhodanine;
3-(2-fluoroallyl)rhodanine;
3-(2-trifluoromethylallyl)rhodanine;
3-(2-trichloromethylallyl)rhodanine;
3-(2-pentabromoethylallyl)rhodanine;
3-(2-tribromomethylallyl)rhodanine;
3-(2-diethylaminoallyl)rhodanine.

Particularly preferred compounds, because of their effectiveness as soil fungicides and for the control of other microorganisms, are those compounds wherein R represents cyano or chlorine—that is: 3-(2-cyanoallyl)-rhodanine and 3-(2-chloroallyl)rhodanine.

The useful N-(2-substituted)allyl rhodanines of the invention may be prepared by the allylation of rhodanine, represented as follows:

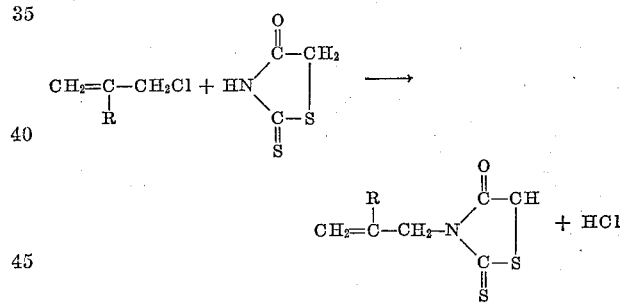

where R is as hereinabove represented.

5-substituted rhodanines were alkylated on the nitrogen according to Erlenmeyer H. and Kleiber A. Helv. Chim. Acta 21, 111 (1938).

The following preparations and fungicidal tests are presented as examples to illustrate the manner in which the invention may be carried out. It is to be understood that the examples are for purposes of illustration only, and that the invention is not to be regarded as limited to any of the specific conditions cited therein.

EXAMPLE I.—PREPARATION OF 3-(2-CYANOALLYL)RHODANINE

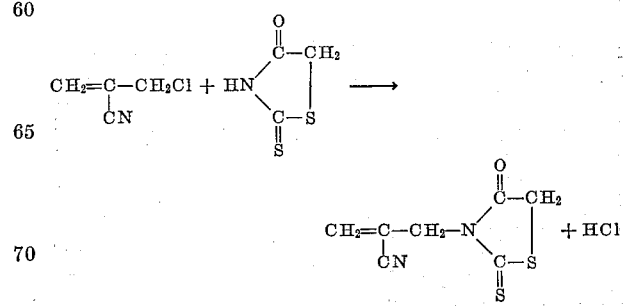

To a suspension of 93 parts of rhodanine in 200 ml. acetonitrile was added with stirring 71 parts of triethylamine. Slight exothermicity was observed. The reaction temperature rose from room temperature to 40° C. The reaction mixture was chilled to 5° C. To the above chilled reaction mixture was added 93 parts of 2-(chloromethyl)acrylonitrile in 10 minutes with stirring and cooling, while the reaction temperature was kept between 5–20° C. A voluminous precipitate was formed in the reaction mixture, which is presumably triethylamine hydrochloride. After the reaction temperature rose to 25° C., the reaction mixture was filtered to remove the salt and the filtrate was concentrated under vacuum to remove the solvent. The residue was extracted with benzene, the benzene extract was washed with 6 N hydrochloric acid, dilute sodium bicarbonate and water. The benzene extract was then concentrated under vacuum to remove benzene and the residue was triturated with 700 ml. ether to give 100 parts of purple solid, M.P. 60–62° C. The structure was confirmed both by elemental analysis and infrared spectra.

Calculated for $N_2S_2OC_7H_6$: C, 42.5; H, 3.0; S, 32.3.
Found: $N_2S_2OC_7H_6$: C, 43.1; H, 3.2; S, 32.0.

Infrared sepectra showed a peak at $7.45\mu$ indicating the presence of C=S bond.

EXAMPLE II.—PREPARATION OF 3-(2-CHLOROALLYL)RHODANINE 26.2 parts of 2-chloroallyl isothiocyanate and 24 parts of ethyl mercaptoacetate were mixed and heated at 150° for three hours until nearly theoretical amount of ethanol was collected as the distillate. The reaction mixture was then subjected to vacuum distillation to yield 24 parts of pale yellow liquid, B.P. 125–127°/0.1 mm. $n_D^{25}$ 1.6338.

Calculated for $NS_2OClC_6H_6$: H, 6.75; Cl, 17.1.
Found: $NS_2OClC_6H_6$: H, 6.6; Cl, 16.8.

EXAMPLE III.—PREPARATION OF 3-(2-CHLOROALLYL)RHODANINE 39.3 parts of 2-chloroallyl isothiocyanate in 80 ml. ether was added portionwise to a solution of 36 parts of ethyl mercaptoacetate in 90 ml. ether and 1.5 ml. triethylamine in 5 minutes. The reaction was exothermic and the reaction temperature rose to a maximum of 45° C. in a period of 20 minutes. The reaction mixture was allowed to stand overnight and washed with dilute hydrochloric acid. The ether layer was dried over anhydrous sodium sulfate and the solvent was removed under vacuum. The residual oil was distilled to obtain 57 parts of light yellow oil, B.P. 125–7°/0.1 mm. Infrared spectrum showed it is identical with the compound obtained in Example II.

EXAMPLE IV.—EFFECTIVENESS OF 3-ALLYL RHODANINES AS SOIL FUNGICIDES

The compounds were evaluated by impregnating the compound on clay granules then blending the granules with soil naturally infected with root rotting organisms. The treated soil was then transferred into small plant pots. Indicator plants were next planted in the treated soil. Observations were made in three weeks on the germination and vigor of the plants. The roots were washed free of soil and indexed for disease.

The diseases and crops on which observations were made were: *Rhizoctonia solani* on tomato, *Fusarium* sp. on cotton, *Thielaviopsis basicola* on pinto beans, and *Pythium ultimum* on sugar beets. Estimates of disease control were expressed on an A-B-C-D basis, A being 75–100% disease control and D being 0–25% control.

The data on several representative N-(2-substituted) allyl rhodanine compounds of the invention are presented in Table I. At the dosages test none of the compounds were phytotoxic to the indicator plants. 3-(2-cyanoallyl)rhodanine and 3-(2-chloroallyl)rhodanine are outstanding soil fungicides.

*Table I.—Toxicity of allyl rhodanines to soil organisms*

| Compound | P.p.m. in soil | Fungitoxic rating | | | |
|---|---|---|---|---|---|
| | | Thielaviopsis | Fusarium | Rhizoctonia | Pythium |
| 3-(2-cyanoallyl) rhodanine | 1.25 | C | AB | A | A |
| | 2.5 | A | A | A | A |
| | 5.0 | A | A | A | A |
| | 10.0 | A | A | A | A |
| | 25.0 | A | A | A | A |
| 3-(2-chloroallyl) rhodanine | 5.0 | | | C | A |
| | 10.0 | A | BC | AB | A |
| | 15.0 | A | A | A | A |

For horticultural purposes, the active compounds of the present invention may be used alone or in combination with other fungicidal, viricidal, insecticidal or acaricidal materials, the action on which may be either internal or external, with plant nutritives, plant hormones, and the like. If desired, a minor amount, of the order of about 0.001 to about 1% by weight of a wetting agent and, if necessary or desirable, stickers such as the heavy hydrocarbon oils with a minimum viscosity of 10° Engler at 50° C. can be present. The wetting agent must be non-reactive with the compounds of the present invention. Non-ionic surfactants seem preferable. If the toxic agents are employed in the form of emulsions or suspensions, for example, in water, solvents such as oils, emulsifiers, emulsion stabilizers, and the like may be added. Any of the conventional wetting agent can be employed. Particularly suitable wetting agents are the sodium salts of a mixture of secondary heptadecyl sulfate, sold commercially under the names of "Teepol" and polyethylene glycol ethers of alkyl phenols sold under the trade names of "Triton X–100" and "Triton X–155." Preferably concentrated compositions comprising an active compound of the present invention and a suitable wetting agent are prepared, and the concentrate is then dispersed in water prior to use.

A further form in which the fungicidal compounds of the present invention may be applied for horticultural use consists of solutions of the active ingredient in suitable inert liquid or semi-solid diluents in which the active ingredient is present in molecularly dispersed form. The form in which the agents to be employed are applied to the objects treated depends on the nature of the object and the purpose of the application. Suitable inert solvents for the manufacture of liquid preparations should not be readily flammable, as odorless as possible and without any toxic effect on humans and animals when properly used. Neither should they have a corrosive effect on the components of the preparations or the material of the storage vessel. Examples of suitable solvents are high-boiling oils, e.g., oils of vegetable origin, such as castor oil, etc., and lower boiling solvents with a flash point of at least 30° C., such as carbon tetrachloride, ethylene dichloride, acetylene tetrachloride, hydrogenated naphthalene, alkylated naphthalene, sorbent naptha, etc. Mixtures of solvents may also be used. Non-aromatic petroleum oils and xylene are commonly employed.

For horticultural use the active compounds of the present invention may also be applied in the form of dusts, utilizing as the inert vehicle such materials as tricalcium phosphate, precipitated chalk, bentonite, kaolin, kieselguhr, etc. These compounds may also be employed in the form of aerosols. For this purpose the active ingredient is dissolved or dispersed in a solvent boiling below room temperature at atmospheric pressure.

Compounds of this invention may comprise as little as 0.1 percent or as much as 95 percent by weight of the total ingredients of a fungicidal formulation.

For field application, the rate of application of the active agent may be varied from about 0.1 to 30 or more pounds per acre. It will be appreciated that the rate of application is subject to variation according to the particular active compound of the invention used, the particular species or complex of organisms to be controlled, the species of plants to be protected, and local conditions, for example, temperature, humidity, moisture content of the soil, nature of the soil and the like. Effective resolution of these factors is well within the skill of those well versed in the pesticide art.

The fungicidal compositions may contain one or more of the soil fungicidal rhodanines set out hereinbefore as the sole active agent, or they may contain in addition thereto other biologically active substances. Thus, for example other fungicides known to the art may be used in conjunction with the compounds of the invention. Insecticides such as, for example DDT, aldrin, dieldrin, endrin, chlordane, methoxychlor, DDVP, naled, Phosdrin® Insecticide, Bidrin® Insecticide, and the like may be incorporated into marketable formulations. Further, if desired, the fungicidal compositions may contain nematocides, fertilizers, trace elements, and the like.

We claim as our invention:
1. A compound of the formula:

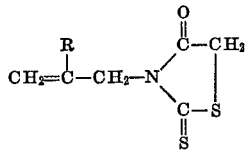

wherein R is a member selected from the group consisting of cyano, halogen, halogen substituted alkyl of 1 to 4 carbon atoms, nitro, and dialkylamino of 2 to 8 carbon atoms.
2. 3-(2-chloroallyl)rhodanine.
3. 3-(2-cyanoallyl)rhodanine.

No references cited.

NICHOLAS S. RIZZO, *Primary Examiner.*